(12) United States Patent
Lu et al.

(10) Patent No.: US 8,560,867 B2
(45) Date of Patent: Oct. 15, 2013

(54) SERVER SYSTEM AND METHOD FOR PROCESSING POWER OFF

(75) Inventors: Ying-Chih Lu, Taipei (TW); Wen-Ping Huang, Taipei (TW)

(73) Assignee: Inventec Corporation, Taipei (TW)

( * ) Notice: Subject to any disclaimer, the term of this patent is extended or adjusted under 35 U.S.C. 154(b) by 371 days.

(21) Appl. No.: 13/161,273

(22) Filed: Jun. 15, 2011

(65) Prior Publication Data

US 2012/0117394 A1 May 10, 2012

(30) Foreign Application Priority Data

Nov. 4, 2010 (TW) ................................ 99137996 A

(51) Int. Cl.
*G06F 1/26* (2006.01)
(52) U.S. Cl.
USPC .............................. 713/310; 713/330; 714/24
(58) Field of Classification Search
USPC ...................................... 713/310, 330; 714/24
See application file for complete search history.

(56) References Cited

U.S. PATENT DOCUMENTS

| | | | | |
|---|---|---|---|---|
| 5,471,624 A | * | 11/1995 | Enoki et al. | 713/1 |
| 6,701,357 B1 | * | 3/2004 | Astarabadi et al. | 709/220 |
| 7,692,998 B2 | * | 4/2010 | Park et al. | 365/227 |
| 2004/0250149 A1 | * | 12/2004 | Tsai et al. | 713/330 |

* cited by examiner

*Primary Examiner* — Thuan Du
(74) *Attorney, Agent, or Firm* — CKC & Partners Co., Ltd.

(57) ABSTRACT

A method for processing power-off suitable for a server system is provided. The server system includes a first node, a second node, and a power supply. The first and second nodes share the power supply. The method includes the following steps. A power-off process is performed by the first and second nodes respectively according to a power-off signal. An interception process is activated to intercept a completion signal generated in the power-off process, and an interrupt is triggered. The interrupt is performed by an interrupt handler, so as to detect whether the first and second nodes complete a power-off process. When the first and second nodes already complete the power-off process, the interception process is inactivated and the generated completion signal is recovered and transferred to the power supply for turning off a power.

8 Claims, 2 Drawing Sheets

SERVER SYSTEM AND METHOD FOR PROCESSING POWER OFF

CROSS-REFERENCE TO RELATED APPLICATION

This application claims the priority benefit of Taiwan application serial no. 99137996, filed Nov. 4, 2010. The entirety of the above-mentioned patent application is hereby incorporated by reference herein and made a part of this specification.

BACKGROUND OF THE INVENTION

1. Field of the Invention

The present invention relates to a server system and a method for processing power-off, in particular, to a server system sharing a power supply and a method for processing power-off.

2. Description of Related Art

Generally speaking, at least two independently operating computer systems are configured in some server systems, and the two computer systems share a power supply and a baseboard management controller (BMC) with each other, so as to reduce the requirement for equipment space of a conventional server and the number of power supplies, thus reducing the cost.

When the server system is in normal operation and a user presses a power switch on the server system, the BMC correspondingly generates a power-off signal for the computer system, so a power-off process is performed on the operating system in the computer system. When the power-off process is completed, the computer system generates a power-off complete signal and sends it to the power supply, so as to cut off a power supplied by the power supply, thus achieving a power-off effect.

However, as the two computer systems operate independently from each other, that is, the computer systems require different time to perform the power-off process. Thus, when the server system performs power-off processing process, if one of the computer systems first completes the power-off process, a power-off complete signal is generated to the power supply to cut off the power. At this time, as the power supply already stops providing power, data loss and access errors might occur to the other computer system of which the power-off process is not completed yet.

SUMMARY OF THE INVENTION

Accordingly, the present invention is directed to a server system and a method for processing power-off, so nodes in the server system can be powered off synchronously, thus avoiding data loss and access errors due to asynchronous power-off processes.

The present invention provides a method for processing power-off suitable for a server system. The server system includes a first node, a second node, and a power supply, and the first and second nodes share the power supply. The method for processing power-off includes the following steps. According to a power-off signal, the first and second nodes respectively perform following steps. First, a power-off process is performed. Next, an interception process is activated to intercept a completion signal generated in the power-off process, and a first interrupt is triggered. Subsequently, an interrupt handler performs the first interrupt, so as to detect whether the first and second nodes complete the power-off process. Next, when the first and second nodes already complete the power-off process, the interception process is inactivated, the completion signal generated in the power-off process is recovered, and the completion signal is transferred to the power supply, so as to turn off a power of the power supply.

In an embodiment of the present invention, an input port of the first node is coupled to an output port of the second node, an output port of the first node is coupled to an input port of the second node, and the detecting whether the first and second nodes complete the power-off process includes the following steps. In the step of detecting the first node, it is detected whether the output port of the first node generates a first logic signal and whether the input port of the first node receives a second logic signal. In the step of detecting the second node, it is detected whether the output port of the second node generates the second logic signal and whether the input port of the second node receives the first logic signal.

In an embodiment of the present invention, the step of recovering the completion signal generated in the power-off process includes writing a preset value in a register.

In an embodiment of the present invention, the first interrupt is a system management interrupt (SMI) and the interrupt handler is an SMI handler.

In an embodiment of the present invention, the method for processing power-off further includes generating a power-off signal by a BMC.

In an embodiment of the present invention, the step of performing the power-off process includes performing the power-off process by a operating system according to a second interrupt.

In an embodiment of the present invention, the second interrupt is a system control interrupt (SCI).

In an embodiment of the present invention, the first and second nodes respectively include a central processing unit (CPU), a north bridge, and a south bridge. The north bridge is coupled to the CPU. The south bridge is coupled to the north bridge. The south bridge of the first node is coupled to the south bridge of the second node, and an input port and an output port of the south bridge of the first node are respectively coupled to an output port and an input port of the south bridge of the second node.

In the present invention, an interception process is activated to intercept a completion signal generated in a power-off process, and when the completion signal is intercepted, an interrupt is triggered, so an interrupt handler processes the interrupt to confirm both the first and second nodes complete the power-off process. After the completion is confirmed, the power-off action of the power supply is performed. Therefore, the first and second nodes can perform power-off synchronously, so as to avoid data loss and access errors due to asynchronous power-off of the two nodes.

In order to make the features and advantages of the present invention more comprehensive, the embodiments are illustrated in detail below with reference to the accompany drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
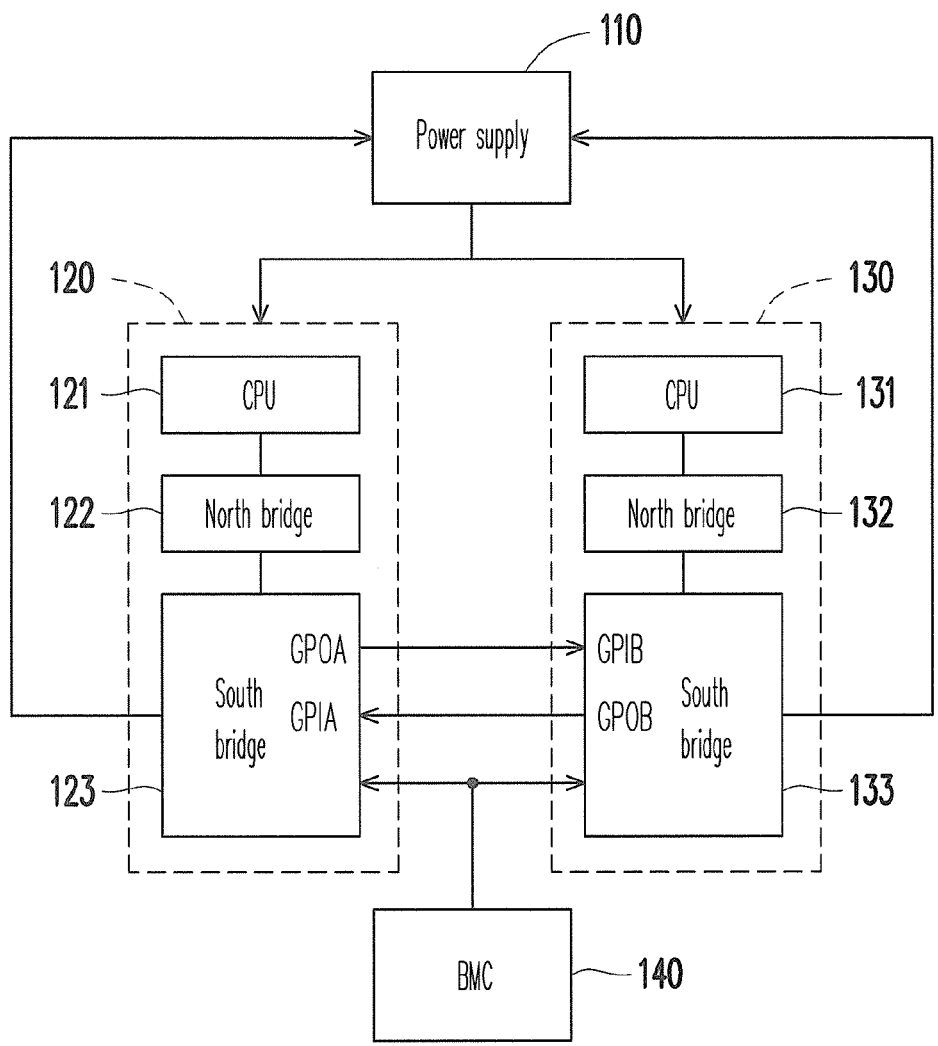
FIG. 1 is a block diagram of a server system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a server system according to an embodiment of the present invention. Referring to FIG. 1, a server system 100 includes a power supply 110, two nodes 120 and 130, and a BMC 140. The power supply 110 is used for supplying a power. The nodes 120 and 130 are coupled to each other and share the power supply 110. In this embodiment, the nodes 120 and 130 can even be independent computer systems, respectively.

The node 120 includes a CPU 121, a north bridge 122, and a south bridge 123, and coupling relations among the CPU 121, the north bridge 122, and the south bridge 123 are as shown in FIG. 1, which are thus not described here. The node 130 includes a CPU 131, a north bridge 132, and a south bridge 133, and coupling relations among the CPU 131, the north bridge 132, and the south bridge 133 are as shown in FIG. 1, which are thus not described here. The south bridge 123 of the node 120 is coupled to the south bridge 133 of the node 130, an input port (general purpose input port) GPIA of the south bridge 123 of the node 120 is coupled to an output port (general purpose output port) GPOB of the south bridge 133 of the node 130, and an output port (general purpose output port) GPOA of the south bridge 123 of the node 120 is coupled to an input port (general purpose input port) GPIB of the south bridge 133 of the node 130.

The BMC 140 is coupled to the nodes 120 and 130 (that is, south bridges 123 and 133) and used for generating a power-off signal to the nodes 120 and 130 according to a status that a user presses a power switch (not shown) to perform a power-off processing process, so as to turn off a power supplied to the nodes 120 and 130 by the power supply.

The elements included in the server system 100 and coupling relations thereof are briefly described above. In the following, the process that the server system 100 performs power off processing is described.

First, for example, when the user presses the power switch (not shown), the BMC 130 receives a message of pressing the power switch, and accordingly generates a power-off signal and sends the power-off signal to the south bridges 123 and 133. Next, the south bridges 123 and 133 generate an SCI and send the SCI to the operating system respectively, so as to perform a power-off process, for example, perform S3, S4 or S5 processes as defined in the advanced configuration and power interface (ACPI) specification on the status thereof.

Generally speaking, when completing the power-off process, the operating system generates a completion signal, for example, writes a preset value in a register (for example, a sleep type register), so the south bridge learns that the power-off process of the node is already completed according to the preset value (the completion signal) in the register, and generates a signal to instruct the power supply to power off itself for achieving the power-off effect.

However, in this embodiment, in the process that the operating system performs the power-off process, the south bridges 123 and 133 activate an interception process to intercept a completion signal generated in the power-off process, and when the completion signal is intercepted, an interrupt is generated to CPUs 121 and 131.

Next, the CPU 121 activates an interrupt handler to process the interrupt, and controls an output port GPOA of the south bridge 123 through the north bridge 122 to generate, for example, a first logic signal with a high voltage level "1", representing that the node 120 already completes the power-off process, and additionally the CPU 131 also activates an interrupt handler to process the interrupt, and controls an output port GPOB of the south bridge 133 through the north bridge 132 to generate a second logic signal with high logic voltage level "1", representing that the node 130 already completes the power-off process.

As the input port GPIA of the south bridge 123 is coupled to the output port GPOB of the south bridge 133, the input port GPIA of the south bridge 123 receives the second logic signal with the high voltage level "1". Therefore, the input port GPIA of the south bridge 123 receives the second logic signal with the high voltage level "1" and the output port GPOA of the south bridge 123 generates the first logic signal with the high voltage level "1", representing that the node 120 already confirms that both the nodes 120 and 130 complete the power-off process.

Furthermore, as the input port GPIB of the south bridge 133 is coupled to the output port GPOA of the south bridge 123, the input port GPIB of the south bridge 133 receives the first logic signal with the high voltage level "1". Therefore, the input port GPIB of the south bridge 133 receives the first logic signal with the high voltage level "1" and the output port GPOB of the south bridge 133 generates the second logic signal with the high voltage level "1", representing that the node 130 already confirms that both the nodes 120 and 130 complete the power-off process.

Next, the nodes 120 and 130 respectively inactivate the interception process and recover the generated completion signal. Next, the south bridges 123 and 133 respectively transfer the completion signal to the power supply 110, so as to turn off the power supplied by the power supply. Therefore, in this embodiment, the nodes 120 and 130 can perform power-off synchronously, so a plurality of errors of data loss and access do not occur to the node 120 or the node 130 as the power of the power supply is already turned off, while the node 120 has completed the power-off process and the node 130 has not completed the power-off process, or vice versa.

In this embodiment, the interrupt can be an (System Management Interrupt, SMI) and the interrupt handler can be an SMI handler. In addition, the input ports and output ports of the south bridges 123 and 133 are general purpose input/output (GPIO) ports. Both the first and second logic signals are with the high voltage level "1", so as to be used as a reference for detecting that both the nodes 120 and 130 already complete the power-off process. However, this embodiment is not limited thereto. The first and second logic signals can also be at the low voltage level "0", so as to be used as a reference that a judgment node detects that both the nodes 120 and 130 already complete the power-off process.

Figure 2:
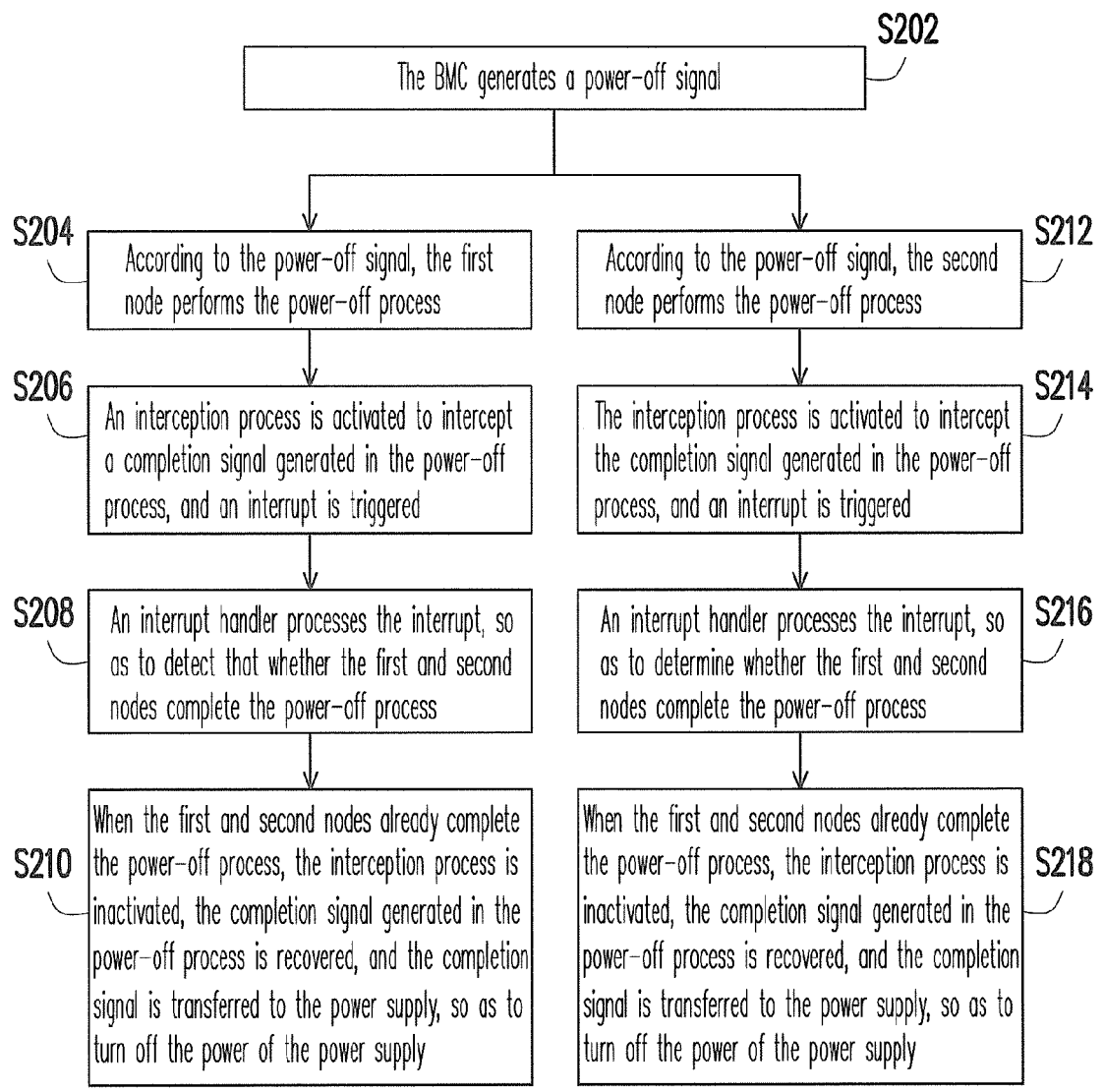
FIG. 2 is a flow chart of a method for processing power-off according to an embodiment of the present invention.

From the description of the embodiment, a flow chart of a method for processing power-off can be concluded. FIG. 2 is a flow chart of a method for processing power-off according to an embodiment of the present invention. The method for processing power-off in this embodiment is suitable for the server system 100 as shown in FIG. 1. Referring to FIG. 2, in Step S202, the BMC generates a power-off signal. Next, according to the power-off signal, the first node (for example, the node 120 in FIG. 1) and the second node (for example, the node 130 in FIG. 1) respectively perform following Steps S204 to S210 and Steps S212 to 216.

In Step S204, according to the power-off signal, the first node performs the power-off process. Next, in Step S206, an interception process is activated to intercept a completion signal generated during the power-off process, and an interrupt is triggered. Subsequently, in Step S208, an interrupt handler processes the interrupt, so as to detect that whether the first and second nodes complete the power-off process. Next, in Step S210, when the first and second nodes already complete the power-off process, the interception process is inactivated, and the completion signal generated during the power-off process is recovered and transferred to the power supply, so as to turn off the power of the power supply.

In addition, the detecting whether the first and second nodes complete the power-off process in Step S208 further includes detecting whether the output port of the first node generates the first logic signal and whether the input port of the first node receives the second logic signal.

Furthermore, in Step S212, according to the power-off signal, the second node performs the power-off process. Next, in Step S214, the interception process is activated to intercept the completion signal generated in the power-off process, and an interrupt is triggered. Subsequently, in Step S216, an interrupt handler processes the interrupt, so as to confirm that both the first and second nodes complete the power-off process. Next, in Step S218, when the first and second nodes already complete the power-off process, the interception process is inactivated, and the completion signal generated in the power-off process is recovered and transferred to the power supply, so as to turn off the power of the power supply.

In addition, the detecting of whether the first and second nodes complete the power-off process in Step S216 further includes detecting whether the output port of the second node generates the second logic signal and whether the input port of the second node receives the first logic signal.

Therefore, the first and second nodes in this embodiment can perform the action of power-off synchronously, so as to avoid data loss and access errors due to asynchronous power-off actions generated at the nodes.

In conclusion, in the present invention, an interception process is activated to intercept the completion signal generated in the power-off process, and when the completion signal is intercepted, an interrupt is triggered, so the interrupt handler processes the interrupt to confirm that both the first and second nodes complete the power-off process. After completion is confirmed, the power-off action of the power supply is performed. Therefore, the first and second nodes can perform power-off synchronously, so as to avoid data loss and access errors due to asynchronous power-off of the two nodes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for processing power-off, suitable for a server system, wherein the server system comprises a first node, a second node, and a power supply, the first and second nodes share the power supply, and the method comprises:

performing, by the first and second nodes respectively according to a power-off signal, following steps:
  performing a power-off process;
  activating an interception process to intercept a completion signal generated during the power-off process, and triggering a first interrupt;
  performing, by an interrupt handler, the first interrupt for detecting whether the first and second nodes complete the power-off process; and
  when the first and second nodes already complete the power-off process, inactivating the interception process, recovering the completion signal generated in the power-off process, and transferring the completion signal to the power supply, so as to turn off a power of the power supply.

2. The method for processing power-off according to claim 1, wherein an input port of the first node is coupled to an output port of the second node, an output port of the first node is coupled to an input port of the second node, and the detecting step of whether the first and second nodes complete the power-off process comprises:
  in the step of detecting the first node, detecting whether the output port of the first node generates a first logic signal and whether the input port of the first node receives a second logic signal; and
  in the step of detecting the second node, detecting whether the output port of the second node generates the second logic signal and whether the input port of the second node receives the first logic signal.

3. The method for processing power-off according to claim 1, wherein the step of recovering the completion signal generated in the power-off process comprises:
  writing a preset value in a register.

4. The method for processing power-off according to claim 1, wherein the first interrupt is a system management interrupt (SMI) and the interrupt handler is an SMI handler.

5. The method for processing power-off according to claim 1, further comprising:
  generating, by a baseboard management controller (BMC), the power-off signal.

6. The method for processing power-off according to claim 1, wherein the step of performing the power-off process comprises:
  performing, by an operating system, the power-off process according to a second interrupt.

7. The method for processing power-off according to claim 6, wherein the second interrupt is a system control interrupt (SCI).

8. The method for processing power-off according to claim 1, wherein the first and second nodes respectively comprise:
  a central processing unit (CPU);
  a north bridge, coupled to the CPU; and
  a south bridge, coupled to the north bridge;
  wherein the south bridge of the first node is coupled to the south bridge of the second node, and an input port and an output port of the south bridge of the first node are respectively coupled to an output port and an input port of the south bridge of the second node.

* * * * *